July 5, 1966   R. W. LARSON   3,259,272
METHOD AND APPARATUS FOR DISPENSING POWDER
Filed June 19, 1964

INVENTOR.
RAY W. LARSON
BY
Elliott & Pastoriza
ATTORNEYS

United States Patent Office 3,259,272
Patented July 5, 1966

3,259,272
METHOD AND APPARATUS FOR DISPENSING POWDER
Ray W. Larson, Santa Monica, Calif., assignor to Korad Corporation, a corporation of California
Filed June 19, 1964, Ser. No. 376,493
7 Claims. (Cl. 222—1)

This invention relates generally to a novel method and apparatus for dispensing powder.

For purposes of the present specification, the preferred embodiment of the method and apparatus will be described in conjunction with the dispensing of powder for growing crystals in a flame-fusion process. However, the basic principles of this invention are applicable to any system in which it is desired to dispense small quantities of finely divided powder in an ordered manner.

In the flame-fusion method of growing crystals, such as used in the manufacture of laser devices, there is provided a furnace incorporating a support or "seed" rod upon which the crystalline structure is formed. Suitable powder for forming the host crystal is mixed with a small additive to provide the laser ions and the mixture placed in a vertical container or hopper above the furnace. In the case of ruby, for example, finely divided aluminum oxide powder suitably mixed with a small amount of chromium oxide powder will provide a properly doped ruby crystal.

A filter screen is disposed beneath the vertical container for supporting the powder immediately above the furnace. The powder mixture is then agitated to cause a small amount to sprinkle periodically downwardly through the screen and be captured on the "seed" rod and through fusion build up into a crystalline structure.

In such growing operations as have been carried out heretofore, the container for the powder is mechanically tapped lightly to cause a sprinkling of the powder through the screen. In some instances, the tapping was actually carried out manually. Later improved versions included means for providing a mechanical type hammer tapping on the container to shake the powder through the screen into the furnace. While fairly satisfactory crystals have been grown by mechanical tapping methods on the powder container, it is very difficult to maintain consistency when a succession of crystals are produced. This is because of the difficulty in tapping at a constant repetition frequency and also the difficulty in insuring that substantially equal quantities of powder are filtered or dispensed with each tap. Moreover, it requires considerable skill to tap with a proper magnitude and at a proper frequency to provide a high quality crystal. The only practical means for determining the proper manner of tapping is by trial and error.

With all of the foregoing considerations in mind, it is a primary object of this invention to provide a novel method and apparatus for dispensing powder, particularly useful in crystal growing operations, which avoids the disadvantages set forth above.

More particularly, it is an object to provide a method and apparatus for dispensing powder in such a manner that consistently high quality crystals may be grown.

Another object is to provide a novel method and apparatus for dispensing powder in a flame-fusion crystal growing operation which is completely automatic in operation and in which the quantities dispensed at any given time and the repetition rate of dispensing may both be varied to meet desired conditions.

Another object is to provide a novel method and apparatus for dispensing powder which is relatively economical, relatively quiet in operation, and in which "packing" of the powder in a container may be avoided to the end that crystals may be grown more rapidly, more economically, and of higher quality than possible heretofore.

Briefly, the method of the invention contemplates the steps of containing the powder to be dispensed within a given region, and then transmitting a pulse of sound energy through the atmosphere in a direction to strike and agitate the powder and thereby shake free a portion of the powder from the containing region. Additional steps of the method include the transmitting of a succession of sound pulses of given intensity and at given pulse repetition rates to dispense successive portions of the powder from the region.

In accordance with a preferred apparatus for carrying out the invention, there is provided an elongated vertical type container for the powder. The lower end of the container includes a transverse screen which serves to support powder stored in the container. At the upper end of the container there is provided a sound generating means such as a loud speaker together with a suitable control circuit for providing electrical pulses to excite the speaker and thereby generate desired pulses of sound. Both the intensity and repetition rate of the sound pulses may be adjusted so that the rate and quantity of powder dispensed by the striking sound pulse may properly be controlled.

A better understanding of the invention will be had by now referring to a preferred embodiment thereof as illustrated in the accompanying drawings, in which.

Figure 1:
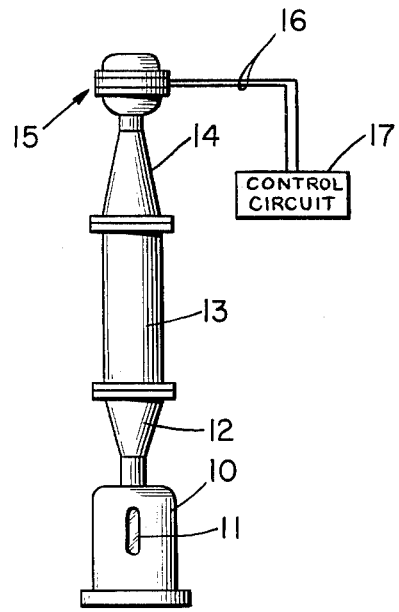
FIGURE 1 is an elevational view partly in schematic form of a flame-fusion crystal growing structure incorporating suitable apparatus for carrying out the method of this invention.

Referring first to FIGURE 1, there is shown a furnace chamber 10 having a viewing window 11 for observing a suitable "seed" rod (not shown). Above the chamber 10 there is provided a feed funnel 12 supporting an elongated vertically disposed powder container 13.

Disposed at the upper end of the powder container 13 is a sound generating means including an adapting structure 14 mounting a sound generator such as a loud speaker 15. The speaker 15 is controlled by electrical pulses passed through leads 16 from a control circuit 17.

Figure 2:
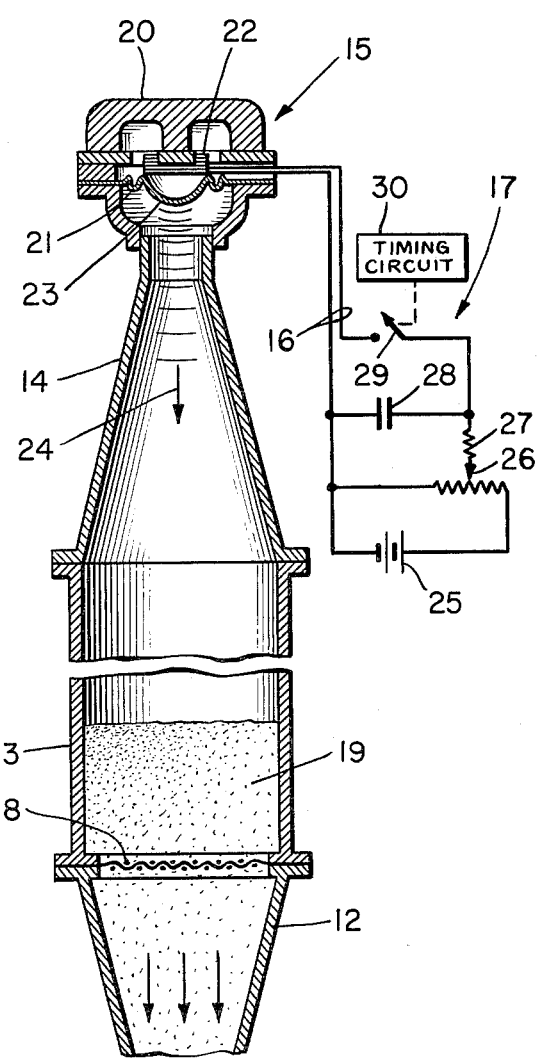
FIGURE 2 is an enlarged cross-section of a portion of the structure illustrated in FIGURE 1 useful in explaining the operation of the invention; and, FIGURE 3 is a simple time plot illustrating electrical pulses employed for energizing the sound generating means in accordance with the invention.

FIGURE 2 illustrates in cross-section the powder container 13 and sound generating structure. As shown, there is provided a filter screen 18 disposed between the feed funnel 12 and container 13 and serving to support the powder material 19. The mesh of the screen 18 is such that the openings are larger than the normal dimensions of the particles making up the powder 19. However, as a consequence of normal packing characteristics of the powder, the powder will be supported by the screen 18 as long as it is not disturbed.

The sound generating structure 15 itself constitutes a moving coil type loud speaker incorporating a permanent magnet 20, diaphragm 21, for supporting a moving coil 22, and a sound generating dome structure 23 movable with the diaphragm 21. Any equivalent means for generating sound in response to electrical pulses may be provided. The structure is designed to direct a pulse of sound energy in a downward direction as indicated by the arrow 24 in response to a pulse of curent received in the moving coil 22.

Figure 3:
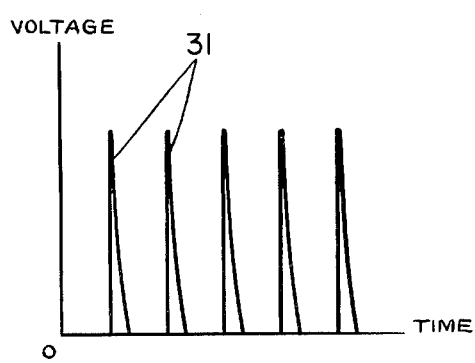

One type of circuit for controlling the speaker 15 is illustrated to the right in FIGURE 3. This circuit includes a voltage source 25 and potentiometer resistance tapped at 26 connected across the battery so that a selected voltage may be provided to define the magnitude of electrical pulses supplied to the speaker. A resistance 27 connects to the tap 26 and cooperates with a storage condenser 28 connected across the leads 16. The circuit is completed by a switch 29 in series with the resistance 27 and controlled by a timing circuit 30. The timing circuit may be of any conventional type for triggering the switch 29 to close and open the same periodically at a desired repetition rate. While the switch 29 has been depicted schematically as a mechanical switch, an electronic switch such as a transistor or equivalent thereof would ordinarily be used.

FIGURE 3 illustrates a series of electrical voltage pulses 31 which are provided by the control circuit on the leads 16 to the speaker. Typically, the magnitude of these voltage pulses may be 30 volts and the pulse width approximately one millisecond. However, by varying the position of the tap 26 and by varying the timing circuit 30, the magnitude and repetition rate of the pulses may be varied as desired.

In operation, powder to be dispensed is placed in the container 13 and the control circuit then energized to provide the electrical pulses 31 to the speaker. Each of these pulses are generated by discharging of the selected voltage appearing across the condenser upon closing of the switch 29 and results in the generation of a sound pulse of energy which is directed downwardly in the direction of the arrow 24 as described in conjunction with FIGURE 2. In the particular embodiment shown, the diaphragm 21 is caused to move in response to the electrical pulse faster than sound so that a shock wave is actually provided to strike and agitate the powder 19. The resulting agitation results in a portion of the powder being shaken free from the remaining powder to filter through the screen 18. By providing a proper magnitude and repetition frequency of the pulse to the speaker, the resulting sound pulses will occur at a magnitude and of a frequency to dispense powder in a controlled manner particularly suitable for growing crystals.

It has been found that the powder 19 may become quite compacted by the impingent of the sound pulses thereon. It is possible to provide negative pulses to the speaker, thereby causing a rarification type wave as opposed to a compression wave or pulse. The result is that the powder 19 may be quickly loosened if it becomes too impacted as a consequence of impingement of compression type sound pulses only. Thus, in certain applications, it is possible to change the polarity of the electrical pulses or, by adding further circuitry, to provide alternate positive and negative pulses to the speaker so that alternate compression and rarifaction sound pulses strike the powder.

From the foregoing description, it will be evident that a completely automatic and controllable method and means have been provided for dispensing powder which fulfills all of the objects set forth.

What is claimed is:

1. A method for dispensing finely divided powder material comprising the steps of: containing said powder in a given region; generating a pulse of electrical energy; transducing said pulse to a sound pulse; and transmitting said sound pulse to said powder through the atmosphere to thereby agitate the same and shake free a portion of said powder from said region.

2. A method according to claim 1, including the additional steps of generating a succession of pulses of electrical energy of given intensity and at a given pulse repetition rate; transducing said succession of pulses to sound pulses; and transmitting said sound pulses to said powder through the atmosphere to dispense successive portions of said powder from said region.

3. An apparatus for dispensing finely divided powder material comprising in combination: containing means for containing said powder; and sound generating means responsive to a pulse of electrical energy to generate a sound pulse in a direction through the atmosphere in said containing means to strike and agitate said powder whereby a quantity of said powder is shaken free of the remaining portion of said powder.

4. An apparatus according to claim 3, in which said sound generating means includes control means for generating successive pulses of sound of given intensity and at a given pulse repetition rate to effect successive agitation of said powder so that given quantities are shaken free at said given pulse repetition rate.

5. An apparatus for periodically dispensing finely divided powder material comprising, in combination: a container for containing said powder; a filtering screen at the lower end of said container for supporting said powder; sound generating means disposed at the upper end of said container and responsive to a pulse of electrical energy to generate a sound pulse in a direction down through said container to strike and agitate said powder in a manner to shake a given quantity of said powder through said screen; and control means for passing a succession of pulses of electrical energy to said sound generating means to provide a succession of sound pulses of a given intensity and at a given pulse repetition rate.

6. An apparatus according to claim 5, in which said control means includes means for varying the magnitude of said pulses of electrical energy; and means for varying the repetition rate of said pulses of electrical energy whereby the intensity and repetition rate of said succession of sound pulses may be varied.

7. An apparatus according to claim 6, in which said sound generating means comprises a moving coil loud speaker connected to receive said pulses of electrical energy.

References Cited by the Examiner

UNITED STATES PATENTS

| | | | |
|---|---|---|---|
| 1,829,899 | 11/1931 | James. | |
| 1,984,651 | 12/1934 | Meves | 222—189 X |
| 2,526,735 | 10/1950 | Duce | 222—196 |
| 2,713,396 | 7/1955 | Travares. | |
| 2,994,165 | 8/1961 | Brevik. | |

FOREIGN PATENTS

| | | |
|---|---|---|
| 593,431 | 3/1956 | Canada. |

RAPHAEL M. LUPO, *Primary Examiner.*